Patented May 30, 1944

2,349,851

UNITED STATES PATENT OFFICE 2,349,851

DI-(CYANAMIDES) AND THEIR MANUFACTURE

Henry Dreyfus, London, England, assignor to Celanese Corporation of America, a corporation of Delaware No Drawing. Application May 20, 1942, Serial No. 443,805. In Great Britain May 16, 1941

4 Claims. (Cl. 260—551)

This invention relates to the manufacture of certain new organic compounds which contain two cyanamide groups —NH.CN. These compounds have been found to have great value in connection with the production and treatment of textile materials. Important examples of the compounds are ethylene, tetramethylene, and, especially, hexamethylene di-(cyanamides).

The novel compounds may be produced by subjecting a diamine, e. g. ethylene diamine or hexamethylene diamine, to reaction with a cyanogen halide, for instance cyanogen bromide or cyanogen chloride. This reaction may be effected by introducing the cyanogen halide in vapour form into the amine which may, if desired, be used in solution in a suitable solvent. In such a process the hydrohalide acid produced may be neutralised, for instance with an alkali metal carbonate or with lime, and this neutralisation may be effected continuously with the reaction by carrying out the latter in presence of the neutralising agent. After the reaction is completed the cyanamide may be recovered from the reaction mixture by solvent extraction followed by evaporation of the solvent. In practice, however, such a process is preferably carried out under such conditions that the cyanogen halide is produced continuously with its use. This result may be achieved by subjecting the amine to simultaneous reaction with a halogen and the cyanide of an alkali metal or of an alkaline earth metal. Thus bromine may be added slowly, as such or in the form of a solution, to a mixture of the amine and potassium or sodium cyanide. Here again diluents may be used if desired and the reaction has been carried out very effectively by mixing the amine with an excess of a 10% solution of the cyanide in water and slowly adding the bromine dissolved in a neutral solvent e. g. benzene, while maintaining the reactants in a state of agitation, and taking care not to allow an excessive rise in temperature, for instance above about 40 or 50° C.

Very good yields of the cyanamides have been obtained by preparing and hydrolising the corresponding di-thioureas. The latter compounds may be prepared by subjecting diamines to reaction with thiocyanates, especially alkali thiocyanates, e. g. potassium or ammonium thiocyanate, the reaction being most suitably carried out in a solvent medium. These compounds hydrolise easily to give the cyanamides when heated with a strong base such as caustic soda especially when the hydrolysis is carried out in presence of a lead compound. Thus the di-thiourea may be obtained by refluxing the amine, e. g. hexamethylene diamine, in a suitable solvent and thereafter with or without separation of the di-thiourea hydrolysing the latter compound by heating with caustic soda and a lead compound, for example lead acetate or lead oxide.

Other methods which may be employed for producing the novel compounds of the invention include, for example, reacting dihalogenated hydrocarbons with metal cyanamides so as to form a metal chloride and the desired compound containing two cyanamide groups. Cyanamide itself may also be employed where the available starting material is a dihalogenated hydrocarbon. The reaction between the di-halogenated hydrocarbon and cyanamide is one involving the formation of a hydrohalide acid and is best conducted in presence of a strong base, for example caustic soda or caustic potash. Where diamines are available as starting materials these may first be converted into the N,N' dihalogenated compounds by reacting the diamines with halogens in the presence or absence of a base to neutralise the hydrohalide acid produced and then reacting the N,N' dihalogenated compounds with a metal cyanide, for instance an alkali metal cyanide, which is preferably used in the form of an aqueous solution.

The following examples illustrate the invention as applied to the production of hexamethylene di-(cyanamides).

Example 1

100 parts by weight of hexamethylene diamine are mixed with an equal weight of sodium cyanide in the form of a 10% solution in water and to the mixture there are added slowly 150 to 175 parts of bromine dissolved in benzene the reagents being vigorously agitated during the addition of the bromine solution and cooled to maintain the reaction temperature below 40° C. When the reaction is completed the benzene layer is removed and distilled.

Hexamethylene di-(cyanamides) is obtained as a pale brown oil which on re-distillation under reduced pressure is recovered as a pale yellow viscous liquid boiling under 50 mm. pressure at 150–155° C. The di-(cyanamides) forms a cloudy solution in water and is soluble in acetone, alcohol and chloroform and insoluble in ether and benzene.

Example 2

100 parts by weight of hexamethylene diamine and 160 parts of ammonium thiocyanate are dissolved together in 800 parts by weight of ethyl alcohol and the mixture refluxed on a water bath until no further ammonia is evolved, an operation usually taking about 14 to 18 hours.

To the solution of hexamethylene di-thiourea thus obtained there is added 75 parts by weight of crushed potash and 600 parts of lead acetate in 400 parts of water and the whole is refluxed for a period of 24 hours. A heavy deposit of black lead sulphide is thrown down and can be filtered off under suction after allowing the reactants to cool. The filtrate which is pale brown in colour is distilled on a water bath to remove alcohol after which the cyanamide is distilled under reduced pressure.

Having described my invention what I desire to secure by Letters Patent is:
1. Polymethylene di-(cyanamides).
2. Hexamethylene di-(cyanamides).
3. Tetramethylene di-(cyanamides).
4. Ethylene di-(cyanamides).

HENRY DREYFUS.